(12) United States Patent
Ayanam et al.

(10) Patent No.: US 9,184,991 B2
(45) Date of Patent: Nov. 10, 2015

(54) METHOD AND APPARATUS FOR DEVELOPING SERVICE PROCESSOR SOLUTIONS

(75) Inventors: Varadachari Sudan Ayanam, Suwanee, GA (US); Baskar Parthiban, Johns Creek, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 973 days.

(21) Appl. No.: 13/349,703

(22) Filed: Jan. 13, 2012

(65) Prior Publication Data

US 2013/0185402 A1 Jul. 18, 2013

(51) Int. Cl.
*G06F 15/177* (2006.01)
*H04L 12/24* (2006.01)
*G06F 9/455* (2006.01)
*H04L 29/08* (2006.01)

(52) U.S. Cl.
CPC ........ H04L 41/0813 (2013.01); *G06F 9/45558* (2013.01); *H04L 67/28* (2013.01)

(58) Field of Classification Search
CPC .............................. G06F 9/45558; H04L 67/28
See application file for complete search history.

(56) References Cited

U.S. PATENT DOCUMENTS

| 6,550,020 | B1 * | 4/2003 | Floyd et al. ..................... 714/10 |
| 7,673,023 | B1 * | 3/2010 | Nelson et al. ................. 709/221 |
| 2002/0095595 | A1 * | 7/2002 | Christopherson et al. ..... 713/200 |
| 2004/0221200 | A1 * | 11/2004 | Armstrong et al. ............. 714/30 |
| 2006/0095551 | A1 * | 5/2006 | Leung et al. .................... 709/223 |
| 2007/0074199 | A1 * | 3/2007 | Schoenberg ................... 717/168 |
| 2007/0086449 | A1 * | 4/2007 | Huang et al. ................... 370/389 |
| 2008/0031238 | A1 * | 2/2008 | Harmelin et al. ............. 370/389 |
| 2008/0126778 | A1 * | 5/2008 | Bishop et al. ..................... 713/2 |
| 2010/0121908 | A1 * | 5/2010 | Nulkar et al. .................. 709/203 |
| 2011/0022812 | A1 * | 1/2011 | van der Linden et al. ..... 711/163 |
| 2011/0029650 | A1 * | 2/2011 | Shah .............................. 709/223 |
| 2011/0078679 | A1 * | 3/2011 | Bozek et al. ....................... 718/1 |
| 2011/0107355 | A1 * | 5/2011 | Durham et al. ............... 719/327 |
| 2012/0124425 | A1 * | 5/2012 | Blouin et al. .................... 714/32 |
| 2012/0151475 | A1 * | 6/2012 | Bealkowski ....................... 718/1 |

* cited by examiner

*Primary Examiner* — Krista Zele
*Assistant Examiner* — James Forman
(74) *Attorney, Agent, or Firm* — Locke Lord LLP; Tim Tingkang Xia, Esq.

(57) ABSTRACT

A computer-implementable method. In one embodiment, the method includes the step of initializing operation of a physical service processor to communicatively couple to a remote file system over a communications link. The remote file system has a computer-executable development module for modifying at least one network configuration setting for the physical service processor. The method also includes the step of causing the development module to modify at least one network configuration setting on a virtual service processor that is operative to emulate operation of the physical service processor, and the step of initializing operation of the virtual service processor with the at least one modified network configuration setting. The method further includes the step of verifying that the virtual service processor, when initialized with the at least one modified network configuration setting, operates without error.

16 Claims, 4 Drawing Sheets

METHOD AND APPARATUS FOR DEVELOPING SERVICE PROCESSOR SOLUTIONS

FIELD OF THE INVENTION

The present invention generally relates to development of solutions for service processors in network computing, and more particularly to development of service processor solutions by using a remote file system and a virtual network setup for modifying or debugging network configurations.

BACKGROUND OF THE INVENTION

Conventionally, a service processor such as a baseboard management controller (BMC) has a processor and its own memory device, and standard firmware is kept in a flash memory. The firmware is loaded from the flash and the kernel boots such that a file system is copied from the flash and operation of the BMC is initialized.

In a BMC development environment, a development machine can be employed for building the sources and a target machine corresponds to the BMC platform. When modifying or debugging network configurations, once any configuration change is made, another firmware image with the changed configuration must be created and then flashed using a firmware upgrade or specific hardware program in order for all the changes to be available. This involves significant downtime. As an example, when a developer is trying to debug an application, in order to see a particular change reflected, the developer must go to the boot loader, use the network, erase the current contents in the flash, and then program the network firmware and boot the BMC again. That is, every time even a single configuration change is made or a simple debug message inserted, the developer must wait for the firmware with the changes to be flashed, a process which can take 15-30 minutes to complete.

A remote file system such as a network file system (NFS) can be used for developing BMC solutions, with the development file system kept on a server. NFS can allow for changes made from a build machine to be reflected quickly on the target system. This can reduce downtime by removing the need to write updated firmware to the BMC to verify correct operation after each individual modification and/or debugging step. Writing the updated firmware may be done by flashing the BMC firmware to a SPI, NAND, or NOR memory device. Accordingly, NFS can be used in a development environment to speed up modification and/or debugging processes. In a development environment using the NFS mode, changes can be made on a server and those changes are made visible on the client almost immediately, since the BMC remains in operation.

For booting a BMC into NFS configuration, only a boot loader is kept on the flash memory. The boot loader loads the file system from a server, wherein the root file system is located on the network. When a BMC is booted in NFS mode, the file system thereby effectively resides on a remote server such that the remote server can be utilized as a development machine.

The BMC by itself has a network stack such as an open source LINUX stack and the network stack is the core foundation for the NFS. NFS requires network support on both the client side and server side, and if the network goes down for any reason, NFS cannot be used. Accordingly, for network configurations to be changed on the server side, for example switching between the use of one network interface of a BMC to another network interface, the network must be brought down, then the network configuration changes made, and then the network brought back up again. During this process, when the network is brought down, the NFS also goes down and cannot be brought back until the BMC is rebooted.

Therefore, heretofore unaddressed needs still exist in the art to address the aforementioned deficiencies and inadequacies.

SUMMARY OF THE INVENTION

According to one or more aspects of the present invention disclosed herein in various exemplary embodiments, an apparatus and method are provided for development of service processor solutions by using a remote file system and a virtual network setup. By practicing one or more aspects of the present invention disclosed herein in various exemplary embodiments, a core network stack is up and running at all times and a virtual network layer runs on top of the core stack. For development purposes, the virtual network layer can be used to test network-related configuration changes without affecting the core layer and the remote file system operates without interruption.

In one aspect, the present invention relates to a computer-implementable method. In one embodiment, the method includes the step of initializing operation of a physical service processor to communicatively couple to a remote file system over a communications link. The remote file system has a computer-executable development module for modifying at least one network configuration setting for the physical service processor. The method also includes the step of causing the development module to modify at least one network configuration setting on a virtual service processor that is operative to emulate operation of the physical service processor, and the step of initializing operation of the virtual service processor with the at least one modified network configuration setting. The method further includes the step of verifying that the virtual service processor, when initialized with the at least one modified network configuration setting, operates without error.

In one embodiment, the method also includes the step of, if the virtual service processor operates without error when initialized with the at least one modified network configuration setting, writing a firmware to a memory device of the physical service processor, wherein the firmware has at least one network configuration setting corresponding to the at least one network configuration setting, as modified, on the virtual service processor.

In one embodiment, the firmware is configured such that, when executed, the physical service processor is initialized with the modified at least one network configuration setting.

In one embodiment, the remote file system is communicatively coupled to a hardware layer that is operatively associated with the physical service processor.

In one embodiment, the development module is communicatively coupled to a virtual network layer on the hardware layer. The virtual network layer is operatively associated with the virtual service processor.

In one embodiment, the step of causing the development module to modify at least one network configuration setting on the virtual service processor includes changing at least one network configuration setting for at least one virtual network interface of the virtual service processor. The at least one virtual network interface is configured to emulate operation of a corresponding at least one network interface of the physical service processor.

In one embodiment, changing the at least one network configuration setting for the at least one virtual network interface includes at least one of the steps of: selecting at least one service to be provided by a remote server computer; and, selecting a port number for at least one service provided by a remote server computer.

In another aspect, the present invention relates to a computer-implementable method wherein, in one embodiment, the method includes the step of initializing operation of a physical service processor to communicatively couple to a remote file system over a communications link. The physical service processor has at least one physical network interface and is operative to perform at least one remote management function for at least one target computer via the at least one physical network interface. The remote file system has a computer-executable development module for modifying at least one network configuration setting for the physical service processor. The method also includes the step of causing the development module to modify at least one network configuration setting on a virtual service processor that is operative to emulate operation of the physical service processor. The virtual service processor has at least one virtual network interface configured to emulate operation of the at least one physical network interface of the physical service processor. The method further includes the steps of initializing operation of the virtual service processor with the at least one modified network configuration setting, and verifying that the virtual service processor, when initialized with the modified network configuration setting, operates without error.

In one embodiment, the method also includes the step of, if the virtual service processor operates without error when initialized with the modified network configuration setting, writing a firmware to a memory device of the physical service processor. The firmware has at least one network configuration setting corresponding to the at least one network configuration setting, as modified, on the virtual service processor.

In one embodiment, the firmware is configured such that, when executed, the physical service processor is initialized with the modified at least one network configuration setting.

In one embodiment, the remote file system is communicatively coupled to a hardware layer that is operatively associated with the physical service processor.

In one embodiment, the development module is communicatively coupled to a virtual network layer on the hardware layer. The virtual network layer is operatively associated with the virtual service processor.

In one embodiment, the step of causing the development module to modify at least one network configuration setting on the virtual service processor includes changing configuration data for remotely managing a computing platform of the corresponding at least one target computer.

In one embodiment, performing the at least one remote management function for the at least one target computer includes monitoring at least one health-related aspect of the operation of one or more hardware components on the at least one target computer.

In yet another aspect, the present invention relates to a computer-readable medium having stored thereon computer-executable instructions which, when executed by one or more processors, cause a computer to perform specific functions. In one embodiment, the functions include initializing operation of a physical service processor to communicatively couple to a remote file system over a communications link. The remote file system has a computer-executable development module for modifying at least one network configuration setting for the physical service processor. The functions also include causing the development module to modify at least one network configuration setting on a virtual service processor that is operative to emulate operation of the physical service processor, and initializing operation of the virtual service processor with the at least one modified network configuration setting. The functions further include verifying that the virtual service processor, when initialized with the modified network configuration setting, operates without error.

In one embodiment, the functions further include, if the virtual service processor operates without error when initialized with the modified network configuration setting, writing a firmware to a memory device of the physical service processor. The firmware has at least one network configuration setting corresponding to the at least one network configuration setting, as modified, on the virtual service processor.

In one embodiment, the firmware is configured such that, when executed, the physical service processor is initialized with the modified at least one network configuration setting.

In one embodiment, the remote file system is communicatively coupled to a hardware layer that is operatively associated with the physical service processor.

In one embodiment, the development module is communicatively coupled to a virtual network layer on the hardware layer. The virtual network layer is operatively associated with the virtual service processor.

In one embodiment, the function of causing the development module to modify at least one network configuration setting on the virtual service processor includes changing at least one network configuration setting for at least one virtual network interface of the virtual service processor. The at least one virtual network interface is configured to emulate operation of a corresponding at least one network interface of the physical service processor.

These and other aspects of the present invention will become apparent from the following description of the preferred embodiments taken in conjunction with the following drawings, although variations and modifications thereof may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used.

Certain terms are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "service processor" refers to a programmable controller such as a baseboard management controller (BMC) that is employed to monitor and detect operating and performance-related parameters associated with a computer system and its constituent components, where the computer system may include one or more target computers, for example multiple server computers in a server rack located at a data center. A service processor can be utilized for configuring and managing aspects of the operation of one or more target computers, using associated configuration tools.

As used herein, "module" refers generally to a storable, computer-executable program containing instructions which, when executed by one or more processors, cause a computing device to perform specific computing tasks such as executing data processing routines or various particular types of abstract data.

Figure 1:
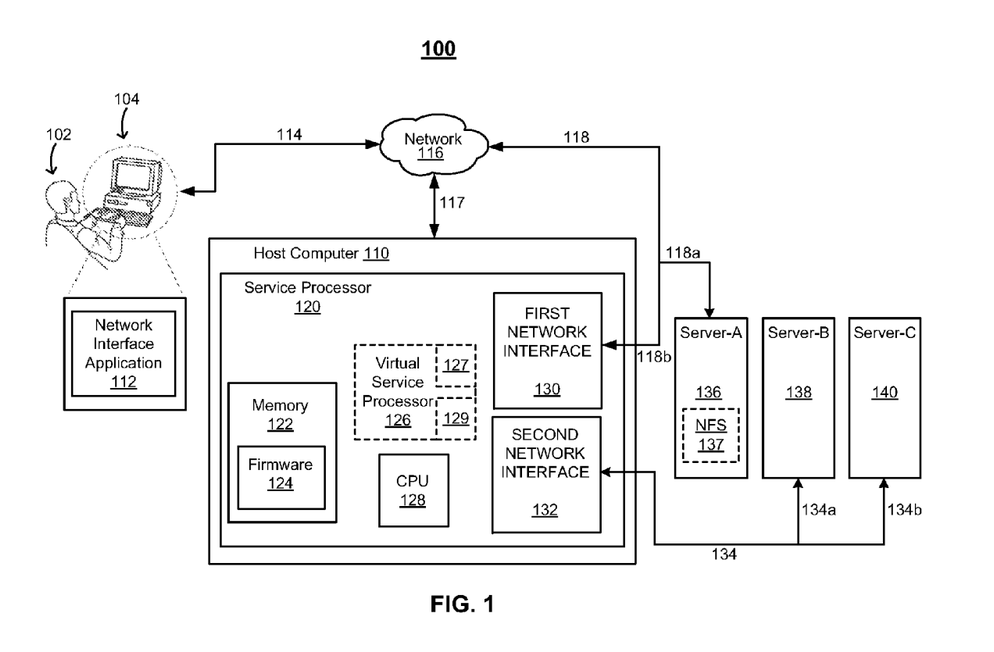
FIG. 1 schematically shows a computing environment for developing service processor solutions, according to one embodiment of the present invention.

The description will be made as to the embodiments in conjunction with the accompanying drawings in FIGS. 1-4. FIG. 1 schematically shows a computing environment for developing service processor solutions, according to one embodiment of the present invention. As shown, a computer system 100 includes a remote management computer 104 with a network interface software application 112 for providing a user 102 with interactive access to communicatively connected remote computers over various network communications links. A managed host computer 110 is communicatively connected to the remote management computer 104 over a communications link 114, 116, 117 that includes a network connection 116 such as an internet or local connection. Communications links may be operatively coupled at one or more network interfaces at the management computer 104, the managed host computer 110, and/or the service processor 120. Although communication links 114, 117, 118, and 134 are represented in FIG. 1 by solid lines, the communication links utilized may take the form of a physical communication cable such as a network-type cable in a local area network (LAN) architecture and/or one or more wireless network communication paths in a wireless area network (WAN), Wi-Fi, or Wi-Max architecture. For example, the communication links 114 and 117 may represent communication paths of wireless signal transmissions being routed between the network connection 116, management computer 104, and service processor 120.

As shown in the embodiment of FIG. 1, the service processor 120 is provided at the managed host computer 110. The service processor 120 encompasses a memory device 122, such as a flash memory device, and a central processing unit (CPU) 128. As shown, the memory device 122 contains a firmware 124 that may be stored as a flash image. As described briefly above and further in detail below with reference to FIG. 4, the service processor 120 corresponds to a type of programmable controller such as a BMC that is used to monitor and detect operating and performance-related parameters associated with a computer system and its constituent components. For performing analysis functions, the service processor 120 is configured with the firmware 124 for implementing procedures relating to system monitoring and recovery. With the firmware 124, the service processor 120 is programmable to monitor various operating and performance-related parameters sensed within a computer system such as a system encompassing the managed host computer 110 and/or target server computers 136, 138, and 140. The service processor 120 may be programmed to analyze collected information in order to determine whether any of the sensed parameters are outside of an expected or recommended operating range.

The service processor 120 has a first network interface 130 and a second network interface 132, at least one of which is operative to perform management functions for target computers such as the host computer 110 and/or server computers 138, 140. The first network interface 130 is operable to communicatively connect to the remote management computer 104 via communications link 114, 116, and 118, and to server computer 136 ("Server-A") via communication link 118a, 118b. The second network interface 132 is operable to communicatively connect to server computers 138 and 140 via communication link 134, which includes communication link segment 134a to server computer 138 ("Server-B") and communication link segment 134b to server computer 140 ("Server-C"). The first network interface 130 and/or second network interface 132 may include an Ethernet network adapter, as one particular example and as further described with reference to the embodiment shown in FIG. 4.

The service processor 120 in FIG. 1 corresponds to a physical service processor that is communicatively coupled to a remote file system 137, such as a network file system (NFS) that is executable on or otherwise operatively associated with a corresponding server ("Server-A") 136.

Those skilled in the art will recognize that NFS is a client-server system that allows users to access files across a network as if the files resided in a local file directory. For example, a user on a first computer linked to a second computer via NFS could access files on the second computer as if the files resided in a directory on the first computer. This is accomplished through processes including exporting, by which an NFS server provides remote clients with access to its files, and mounting, by which file systems are made available to the operating system and the user. The NFS protocol is designed to be independent, operating system, network architecture, and transport protocol. Accordingly, systems using an NFS service may be manufactured by different vendors and use different operating systems, and may be connected to networks with different architectures. Such differences are transparent to an NFS application, and thus, the user.

As described in more detail below with reference to the exemplary embodiment in FIG. 2, the remote file system 137 shown in FIG. 1 is operatively associated with a computer-executable development module for modifying and debugging one or more network configurations for the service processor 120. The development module can be used in conjunction with or as part of development software and/or hardware for modifying and debugging particular network-related operational configurations or configuration settings for the physical service processor 120, by utilizing a virtual service processor 126 that is operative to emulate one or more functions of the physical service processor 120. For example, parts of or all of the development software may be executed on the management computer 104 and additionally or alternatively in association with network-based software tools executing on the remote server for the development system and remote file system. A network interface application 112, which may take the form of a web-based browser, enables the user 102 to access the development tools remotely over the network connection 116, which may be an internet connection. As shown in FIG. 1, the virtual service processor 126 has a first virtual network interface 127 and a second virtual network interface 129, which are configured to emulate operations of corresponding network interfaces 130, 132 on the physical service processor 120. Although the virtual service processor 126 is illustrated in FIG. 1 as encompassed by the physical service processor 120, the virtual service processor 126 may be executed on another operatively associated computer such that the functions of the virtual service processor appear to the development and file system as corresponding to functions of the physical service processor 120.

Those skilled in the art will recognize that a virtual machine is a software representation of a physical machine, which can run or host a guest operating system and one or more applications. Virtualization provides for a layer of abstraction between physical computing hardware, storage hardware, and network hardware and the operating system and applications that are executable on a computing device. A virtual computing device can be created with a uniform hardware image implemented in software, on which operating systems and applications run. Virtual hardware components can be implemented in software to emulate functions of the corresponding physical components. In an exemplary computing system that implements virtualization, virtual machines are installed on a host platform that includes a system hardware platform, components that include system-level software such as an operating system or similar kernel, and a virtual machine monitor or hypervisor. Applications running on a virtual machine can function as if running via a guest operating system and virtual processors, and executable files can be accessed by the guest operating system from a virtual disk or virtual memory allocated to the virtual machine.

Figure 2:
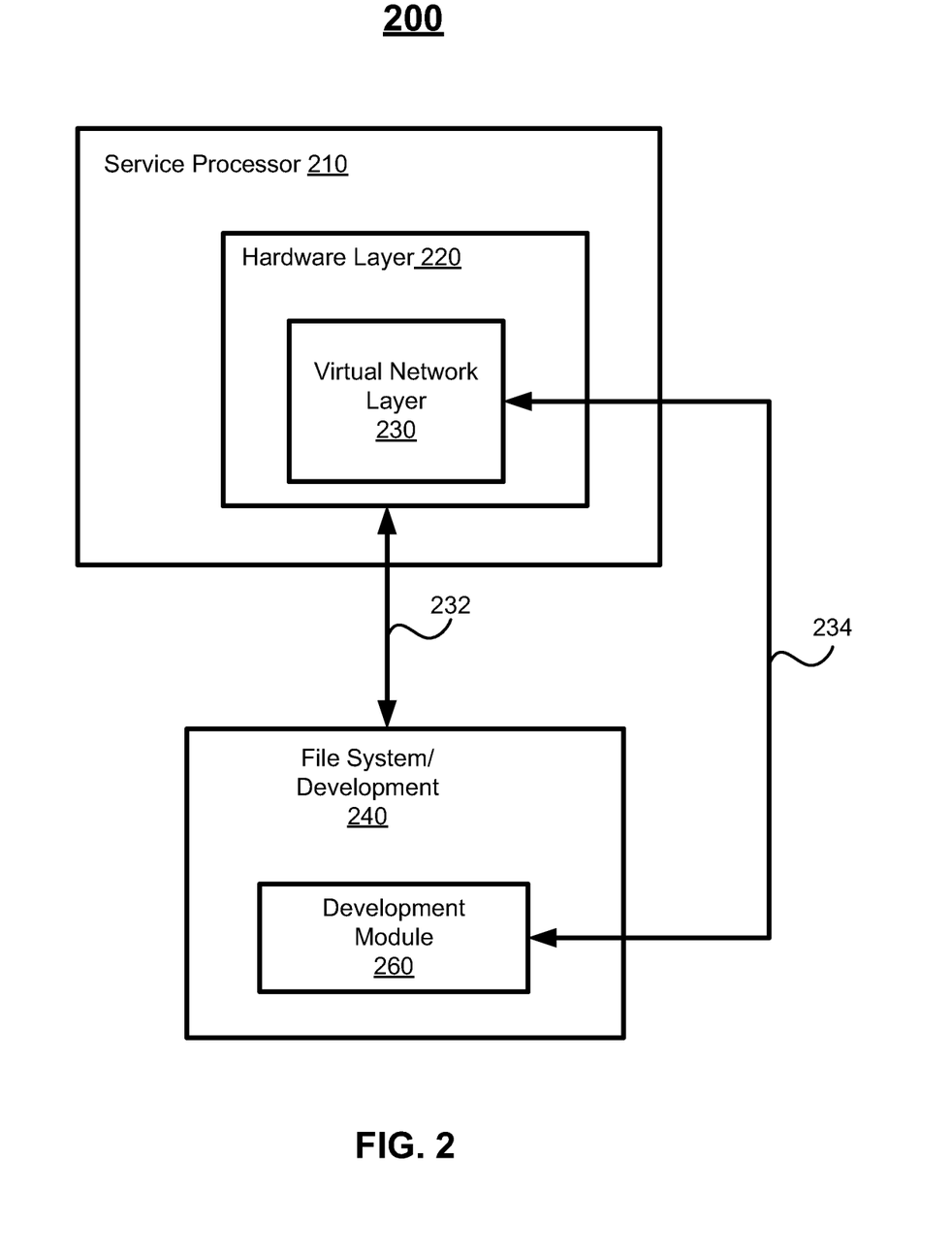
FIG. 2 schematically shows a service processor communicatively coupled to a development system and remote file system, with an abstracted hardware layer and virtual network layer, according to one embodiment of the present invention.

FIG. 2 schematically shows a service processor communicatively coupled to a development system and remote file system, according to one embodiment of the present invention. As shown, a physical service processor 210 is operative to communicatively couple to a development system 240 over communications links 232, 234. The physical service processor 210 can be configured as a baseboard management controller (BMC) that is operative to perform one or more remote management functions for one or more target computers. A remote file system such a network file system (NFS) is operatively associated with the development system 240. A development module 260 is executable for modifying and/or debugging one or more network configuration settings for the physical service processor 210. The development system 240 is communicatively coupled to a hardware layer 220 via communications link 232, wherein the hardware layer 220 is operatively associated with the physical service processor 210. The development module 260 is communicatively coupled to a virtual network layer 230 on the hardware layer 220 via a communications link 234. The virtual network layer 230 is operatively associated with a virtual service processor. As described above with reference to FIG. 1, one or more network configurations can be changed and/or debugged using a virtual service processor that is operative to emulate one or more functions of the physical service processor 210. The development module 260 can be used in conjunction with or as part of development software and hardware for modifying and debugging particular network-related operational configurations or specific configuration settings.

Figure 3:
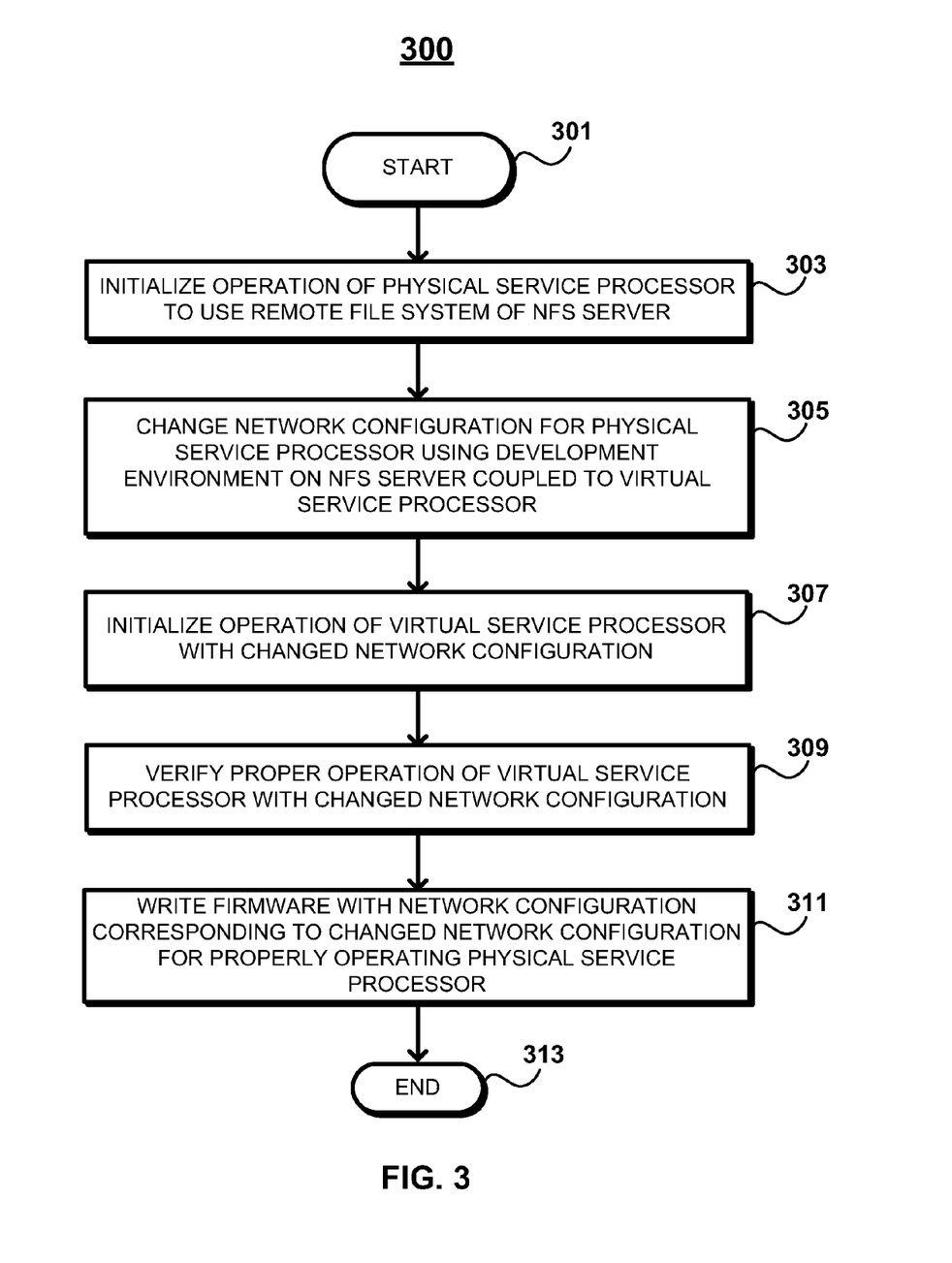
FIG. 3 is a flow chart illustrating operational steps of a method for developing service processor solutions, according to one embodiment of the present invention.

Now referring specifically to FIG. 3, a flow chart illustrates operational steps of a method for developing service processor solutions, according to one embodiment of the present invention. It should be appreciated that operational steps of the method may be performed by one or more processors associated with the remote management computer, host computer, and/or one or more of the target server computers of the computer system shown in and described with reference to the embodiment of FIG. 1, according to computer-executable instructions that can be stored on a non-transitory computer-readable medium.

The method 300 starts at step 301 and includes the step of initializing the operation of a physical service processor to communicatively couple to a remote file system over a communications link, at step 303. In one embodiment, the remote file system corresponds to a network file system (NFS). The service processor, in one embodiment, corresponds to a baseboard management controller (BMC) that is operative to perform at least one remote management function for one or more target computers via one or more network interfaces. At step 305, one or more network configurations are changed and/or debugged using a virtual service processor that is operative to emulate one or more functions of the physical service processor.

In one embodiment, a network configuration setting for the physical service processor is changed for a virtual service processor using the development environment associated with the remote file system. In one embodiment, a computer-executable development module or other form of development software or hardware tools is used for modifying and debugging particular network-related operational configurations or specific configuration settings.

In one embodiment, changing one or more configurations on the virtual service processor includes changing configuration data for remotely managing a computing platform of a target computer. Remote management of a computing platform of a target computer, in one embodiment, includes monitoring one or more health-related aspects of the operation of one or more hardware components on the target computer. In one embodiment, the virtual service processor has one or more virtual network interfaces that are configured to emulate functions of one or more corresponding physical network interfaces of the physical service processor. In one embodiment, changing configurations for the virtual network interface includes selecting one or more network-based services to be provided by one or more target computers such as a remote server computers, the services including one or more of CD/DVD redirection, KVM redirection, text console redirection, USB flash drive redirection, mass storage, electronic mail, FTP, VPN, DHCP, backup, and/or proxy, for example. Changing configurations may also or alternatively include selecting one or more port numbers to be used for network-based services.

In a development environment using a remote file system such as NFS, the service processor may include two network interfaces, wherein one interface is utilized for development purposes and the other network interface functions as a backup. In one embodiment, changing configurations for the virtual service processor includes performing network bonding and/or load balancing functions. In an exemplary BMC solution stack, in network bonding two or more network interfaces are functionally combined into one, and load balancing provides for routing packets to different interfaces.

After step 305, at step 307 the virtual service processor is initialized with one or more of the network configurations that were modified and/or debugged. Next, at step 309, a verification is made to determine whether the virtual service processor, when initialized with these network configurations, operates without errors. At step 311, if it has been determined that the virtual service processor, when initialized with the network configurations, operates without errors, then firmware that includes network configurations corresponding to the network configurations that were modified and/or debugged for the virtual service processor, is written to a memory device of the physical service processor. The firmware is configured such that, when executed, the physical service processor is initialized for operation according to these network configurations.

Figure 4:
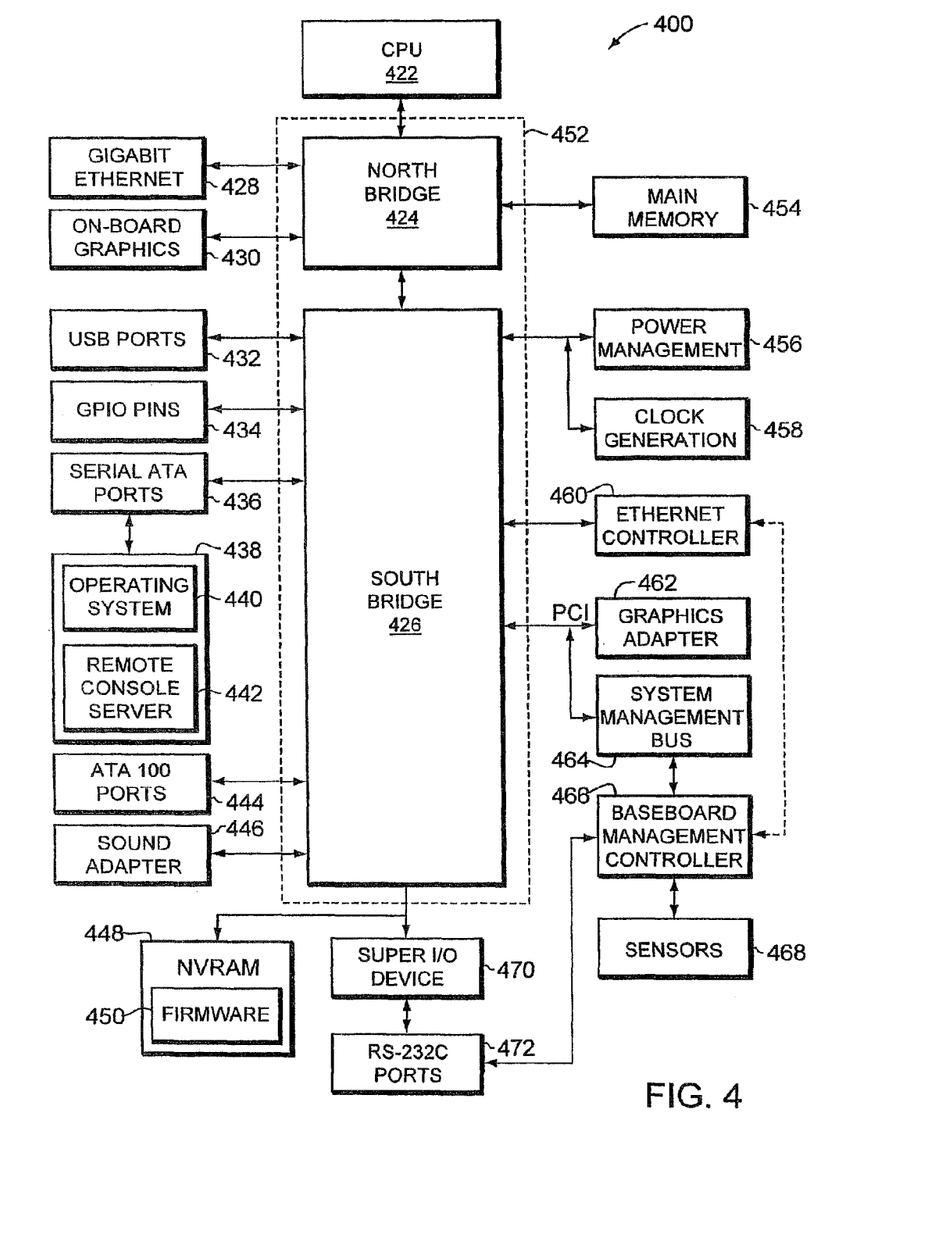
FIG. 4 schematically shows computer architecture for various computing systems utilized according to one or more embodiments of the present invention.

Now referring specifically to FIG. 4, computer architecture of an exemplary computing system is shown, which may be utilized according to one or more embodiments of the present invention. The architecture shown in FIG. 4 corresponds to a computer 400 having a baseboard, or "motherboard," which is a printed circuit board to which components or devices may be connected by way of a system bus or other electric communication path. In one embodiment, a central processing unit (CPU) 422 operates in conjunction with a chipset 452. The CPU 422 is a standard central processor that performs arithmetic and logical operations necessary for the operation of the computer 400. It should be appreciated that the computer 400 may include additional processors to work in conjunction with the CPU 422.

The chipset 452 includes a north bridge 424 and a south bridge 426, where the north bridge 424 provides an interface between the CPU 422 and the remainder of the computer 400. The north bridge 424 also provides an interface to a random access memory (RAM) used as the main memory 454 in the computer 400 and, optionally, to an onboard graphics adapter 430. The north bridge 424 may also include functionality for providing networking functions through a network adapter 428, shown in FIG. 4 as an Ethernet adapter. The network adapter 428 is operative to connect the computer 400 to one or more other computers via network connections. Connections which may be made by the network adapter 428 include local area network (LAN) or wireless area network (WAN) connections. Those skilled in the art will recognize that LAN and WAN networking environments are commonplace in offices, enterprise-wide computer networks, intranets, and internet-based network architecture. As shown, the north bridge 424 is connected to the south bridge 426.

The south bridge 426 is operative to control input/output functions of the computer 400. In particular, the south bridge 426 may provide one or more universal serial bus (USB) ports 432, a sound adapter 446, a network controller 460 shown as an Ethernet controller, and one or more general purpose input/output (GPIO) pins 434. The south bridge 426 may also provide a bus for interfacing peripheral card devices such as a graphics adapter 462. In one embodiment, the bus comprises a peripheral component interconnect (PCI) bus. The south bridge 426 may also provide a system management bus 464 for use in managing the various components of the computer 400, and a power management module 456.

The south bridge 426 is also operative to provide one or more interfaces for connecting mass storage devices to the computer 400. For instance, according to an embodiment, the south bridge 426 includes a serial advanced technology attachment (SATA) adapter for providing one or more serial ATA ports 436 and an ATA-100 adapter for providing one or more ATA-100 ports 444. The serial ATA ports 436 and ATA-100 ports 444 may be, in turn, connected to one or more mass storage devices, such as a SATA disk drive 438 storing an operating system 440 and application programs. Those skilled in the art will recognize that an operating system 440 has a set of programs that control operations of a computer and allocation of resources. An application program is software that runs on top of the operating system software, or other runtime environment, and uses computer resources to perform application-specific tasks desired by the user. A remote console server application 442 is stored on the drive 438 and executed by the computer 400 to redirect the text or graphical display of the computer 400 once the operating system and remote console server application 442 have been loaded.

According to one embodiment, the operating system 440 corresponds to a WINDOWS® operating system and the remote console server application 442 includes a remote desktop application compatible with remote desktop protocol (RDP). According to an alternative embodiment, the operating system 440 corresponds to a LINUX operating system and the remote console server 442 includes a server that is compatible with the SDP protocol for providing a redirect text display. It should be appreciated that other types of remote desktop servers that are compatible with other types of remote desktop protocols may also be utilized.

Mass storage devices connected to the south bridge 426, and their associated computer-readable media, provide non-volatile storage for the computer 400. Although the description of computer-readable media contained herein refers to a mass storage device such as a hard disk drive, those skilled in the art will recognize that computer-readable media can be any available media that can be accessed by the computer 400. Computer-readable media may include computer storage media and communication media. Computer storage media includes volatile and non-volatile, removable and non-removable media implemented in any method or technology for storage of information such as computer-readable instructions, data structures, program modules or other data. Computer storage media includes RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 400.

A low pin count ("LPC") interface may also be provided by the south bridge for connecting a "Super I/O" device 470. The Super I/O device 470 is responsible for providing a number of input/output ports, including a keyboard port, a mouse port, a serial interface 472, a parallel port, and other types of input/ output ports. The LPC interface may also connect a computer storage media such as a ROM or a flash memory such as a NVRAM 448 for storing the firmware 450 that includes program code containing the basic routines that are operative to start up the computer 400 and to transfer information between elements within the computer 400. It should be appreciated that during execution of BIOS and POST portions of the firmware 450, text screen displays of the computer 400 may be provided via serial ports or a network controller using serial-over-LAN protocol.

The south bridge 426 may include a system management bus 464. The system management bus 464 may be operatively associated with a baseboard management controller (BMC) 466. In general, the BMC 466 is a microcontroller that monitors operation of the computer system 400. In a more specific embodiment, the BMC 466 monitors health-related aspects associated with the computer system 400, such as the temperature of one or more components of the computer system 400, speed of rotational components (e.g. spindle motor, CPU fan, etc.) within the system, the voltage across or applied to one or more components within the system 400, and the available or used capacity of memory devices within the system 400. To accomplish these monitoring functions, the BMC 466 is communicatively connected to one or more components by way of the management bus 464. In one exemplary embodiment, these components include sensor devices for measuring various operating and performance-related parameters within the computer system 400. It should be appreciated that the management bus 464 may include components other than those explicitly shown in FIG. 4. In one embodiment, the management bus 464 is an I2C bus. It should be appreciated that several physical interfaces exist for communicating with the BMC 466 in addition to the management bus 464. Serial ports and a network controller may be utilized to establish a connection with the BMC 466.

The management bus 464 is used by the BMC 466 to request and/or receive various operating and performance-related parameters from one or more components, which are also communicatively connected to the management bus 464. For instance, in one embodiment, the management bus 464 communicatively connects the BMC 466 to a CPU temperature sensor and a CPU fan (not shown in FIG. 4), thereby providing a means for the BMC 466 to monitor and/or control operation of these components. The BMC 466 may be directly connected to sensors 468. The serial ports 472 and the Ethernet controller 460 may be utilized to establish a connection with the BMC 466.

According to one embodiment, firmware of the BMC 466 adheres to the Intelligent Platform Management Interface (IPMI) industry standard for system monitoring and event recovery. The IPMI specification provides a common message-based interface for accessing all of the manageable features in the computer 400. IPMI includes a set of predefined commands for reading temperature, voltage, fan speed, chassis intrusion and other parameters. System event logs, hardware watchdogs, and power control can also be accessed through IPMI. In this manner, IPMI defines protocols for accessing the various parameters collected by the BMC 466 through the operating system 440 or through an external connection, such as through a network or serial connection.

It should be appreciated that although the computer 400 shown in the embodiment of FIG. 4 is described in the context of a server computer, other types of computer system configurations may be used, such as multiprocessor systems, minicomputers, or personal desktop or laptop computers. It is also contemplated that the computer 400 may not include all of the components shown in FIG. 4 and/or may include other components that are not explicitly shown in FIG. 4.

Referring again to FIGS. 1-4, in one aspect, the present invention relates to a computer-implementable method. In one embodiment, the method includes the step of initializing operation of a physical service processor (120 in FIG. 1; 210 in FIG. 2) to communicatively couple to a remote file system (137 in FIG. 1; 240 in FIG. 2) over a communications link (114, 116, 118 in FIG. 1; 232, 234 in FIG. 2) (step 303). The remote file system (137 in FIG. 1; 240 in FIG. 2) has a computer-executable development module 260 for modifying at least one network configuration setting for the physical service processor (120 in FIG. 1; 210 in FIG. 2). The method also includes the step of causing the development module 260 to modify at least one network configuration setting on a virtual service processor 126 that is operative to emulate operation of the physical service processor (120 in FIG. 1; 210 in FIG. 2) (step 305). The method further includes the step of initializing operation of the virtual service processor 126 with the at least one modified network configuration setting (step 307) and the step of verifying that the virtual service processor 126, when initialized with the at least one modified network configuration setting, operates without error (step 309).

In one embodiment, the method further includes the step of, if the virtual service processor 126 operates without error when initialized with the at least one modified network configuration setting, writing a firmware 124 to a memory device 122 of the physical service processor (120 in FIG. 1; 210 in FIG. 2) (step 311). The firmware 124 has at least one network configuration setting corresponding to the at least one network configuration setting, as modified, on the virtual service processor 126.

In one embodiment, the firmware 124 is configured such that, when executed, the physical service processor (120 in FIG. 1; 210 in FIG. 2) is initialized with the modified at least one network configuration setting.

In one embodiment, the remote file system (137 in FIG. 1; 240 in FIG. 2) is communicatively coupled to a hardware layer 220 (via communication link 232) that is operatively associated with the physical service processor (120 in FIG. 1; 210 in FIG. 2).

In one embodiment, the development module 260 is communicatively coupled to a virtual network layer 230 (via communications link 234) on the hardware layer 220. The virtual network layer 230 is operatively associated with the virtual service processor 126.

In one embodiment, the step of causing the development module 260 to modify at least one network configuration setting on the virtual service processor 126 (step 305) includes changing at least one network configuration setting for at least one virtual network interface 127, 129 of the virtual service processor 126. The at least one virtual network interface 127, 129 is configured to emulate operation of a corresponding at least one network interface 130, 132 of the physical service processor (120 in FIG. 1; 210 in FIG. 2).

In one embodiment, changing the at least one network configuration setting for the at least one virtual network interface 127, 129 includes at least one of: selecting at least one service to be provided by a remote server computer (for example, Server-A 138 or Server-B 140), and selecting a port number for at least one service provided by a remote server computer (for example, Server-A 138 or Server-B 140).

In another aspect, the present invention relates to a computer-implementable method. In one embodiment, the method includes the step of initializing operation of a physical service processor (120 in FIG. 1; 210 in FIG. 2) to communicatively couple to a remote file system (137 in FIG. 1; 240 in FIG. 2) over a communications link (114, 116, 118 in FIG. 1; 232, 234 in FIG. 2) (step 303). The physical service processor (120 in FIG. 1; 210 in FIG. 2) has at least one physical network interface 130, 132 and is operative to perform at least one remote management function for at least one target computer (for example, Server-B 138 and Server-C 140) via the at least one physical network interface 130, 132. The remote file system (137 in FIG. 1; 240 in FIG. 2) has a computer-executable development module 260 for modifying at least one network configuration setting for the physical service processor (120 in FIG. 1; 210 in FIG. 2). The method also includes the step of causing the development module 260 to modify at least one network configuration setting on a virtual service processor 126 that is operative to emulate operation of the physical service processor (120 in FIG. 1; 210 in FIG. 2) (step 305). The virtual service processor 126 has at least one virtual network interface 127, 129 that is configured to emulate operation of the at least one physical network interface 130, 132 of the physical service processor (120 in FIG. 1; 210 in FIG. 2). The method also includes the step of initializing operation of the virtual service processor 126 with the at least one modified network configuration setting (step 307) and the step of verifying that the virtual service processor 126, when initialized with the modified network configuration setting, operates without error (step 309).

In one embodiment, the method also includes the step of, if the virtual service processor 126 operates without error when initialized with the modified network configuration setting, writing a firmware 124 to a memory device 122 of the physical service processor (120 in FIG. 1; 210 in FIG. 2) (step 311). The firmware 124 has at least one network configuration setting corresponding to the at least one network configuration setting, as modified, on the virtual service processor 126.

In one embodiment, the firmware 124 is configured such that, when executed, the physical service processor (120 in FIG. 1; 210 in FIG. 2) is initialized with the modified at least one network configuration setting.

In one embodiment, the remote file system (137 in FIG. 1; 240 in FIG. 2) is communicatively coupled to a hardware layer 220 (via communication link 232) that is operatively associated with the physical service processor (120 in FIG. 1; 210 in FIG. 2).

In one embodiment, the development module 260 is communicatively coupled to a virtual network layer 230 (via communications link 234) on the hardware layer 220. The virtual network layer 230 is operatively associated with the virtual service processor 126.

In one embodiment, the step of causing the development module 260 to modify at least one network configuration setting on the virtual service processor 126 (step 305) includes changing configuration data for remotely managing a computing platform of the corresponding at least one target computer (for example, Server-B 138 and Server-C 140).

In one embodiment, performing the at least one remote management function for the at least one target computer (for example, Server-B 138 and Server-C 140) includes monitoring at least one health-related aspect of the operation of one or more hardware components (see, for example, sensors 468 in FIG. 4) on the at least one target computer (for example, Server-B 138 and Server-C 140).

In yet another aspect, the present invention relates to a computer-readable medium having stored thereon computer-executable instructions which, when executed by one or more processors (for example, CPU 128 and/or CPU 422), cause a computer (for example, host computer 110) to perform specific functions. In one embodiment, the functions include initializing operation of a physical service processor (120 in FIG. 1; 210 in FIG. 2) to communicatively couple to a remote file system (137 in FIG. 1; 240 in FIG. 2) over a communications link (114, 116, 118 in FIG. 1; 232, 234 in FIG. 2) (step 303). The remote file system (137 in FIG. 1; 240 in FIG. 2) has a computer-executable development module 260 for modifying at least one network configuration setting for the physical service processor (120 in FIG. 1; 210 in FIG. 2). The functions also include causing the development module 260 to modify at least one network configuration setting on a virtual service processor 126 that is operative to emulate operation of the physical service processor (120 in FIG. 1; 210 in FIG. 2) (step 305). The functions further include initializing operation of the virtual service processor 126 with the at least one modified network configuration setting (step 307), and verifying that the virtual service processor 126, when initialized with the modified network configuration setting, operates without error (step 309).

In one embodiment, the functions further include, if the virtual service processor 126 operates without error when initialized with the modified network configuration setting, writing a firmware 124 to a memory device 122 of the physical service processor (120 in FIG. 1; 210 in FIG. 2) (step 311). The firmware 124 has at least one network configuration setting corresponding to the at least one network configuration setting, as modified, on the virtual service processor 126.

In one embodiment, the firmware 124 is configured such that, when executed, the physical service processor (120 in FIG. 1; 210 in FIG. 2) is initialized with the modified at least one network configuration setting.

In one embodiment, the remote file system (137 in FIG. 1; 240 in FIG. 2) is communicatively coupled to a hardware layer 220 (via communication link 232) that is operatively associated with the physical service processor (120 in FIG. 1; 210 in FIG. 2).

In one embodiment, the development module 260 is communicatively coupled to a virtual network layer 230 (via communications link 234) on the hardware layer 220. The virtual network layer 230 is operatively associated with the virtual service processor 126.

In one embodiment, the function of causing the development module 260 to modify at least one network configuration setting on the virtual service processor 126 (step 305) includes changing at least one network configuration setting for at least one virtual network interface 127, 129 of the virtual service processor 126. The at least one virtual network interface 127, 129 is configured to emulate operation of a corresponding at least one network interface 130, 132 of the physical service processor (120 in FIG. 1; 210 in FIG. 2).

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A computer-implementable method, comprising the steps of:
    (a) initializing operation of a physical service processor to communicatively couple to a remote file system over a communications link, wherein the physical service processor has a first set of network configuration settings and at least one physical network interface, such that the physical service processor is operative to perform at least one remote management function for at least one target computer via the at least one physical network interface, a virtual service processor is executable to be operative to emulate operation of the physical service processor, the virtual service processor has a second set of network configuration settings corresponding to the first set of network configuration settings of the physical service processor and at least one virtual network interface configured to emulate operation of the at least one physical network interface of the physical service processor, wherein the second set of network configuration settings of the virtual service processor comprises at least one network configuration setting for the at least one virtual network interface, and the remote file system has a computer-executable development module for modifying the first set of network configuration settings of the physical service processor and the second set of network configuration settings of the virtual service processor;
    (b) causing the development module to modify the second set of network configuration settings of the virtual service processor, comprising changing the at least one network configuration setting for the at least one virtual network interface of the virtual service processor by:
        (i) selecting at least one service to be provided by a remote server computer; and
        (ii) selecting a port number for at least one service provided by a remote server computer; and
    (c) in response to the second set of network configuration settings being modified,
        (1) initializing operation of the virtual service processor with the modified second set of network configuration settings; and
        (2) verifying that the virtual service processor, when initialized with the modified second set of network configuration settings, operates without error.

2. The method of claim 1, further comprising the step of, if the virtual service processor operates without error when initialized with the modified second set of network configuration settings, writing a firmware to a memory device of the physical service processor, the firmware having a new set of network configuration settings corresponding to the modified second set of network configuration settings of the virtual service processor.

3. The method of claim 2, wherein the firmware is configured such that, when executed, the physical service processor is initialized with the new set of network configuration settings.

4. The method of claim 1, wherein the remote file system is communicatively coupled to a hardware layer that is operatively associated with the physical service processor.

5. The method of claim 4, wherein the development module is communicatively coupled to a virtual network layer on the hardware layer, and the virtual network layer is operatively associated with the virtual service processor.

6. The method of claim 1, wherein the step of causing the development module to modify the second set of network configuration settings of the virtual service processor comprises changing configuration data for remotely managing a computing platform of the at least one target computer.

7. The method of claim 6, wherein the at least one remote management function for the at least one target computer comprises monitoring at least one health-related aspect of the operation of one or more hardware components on the at least one target computer.

8. A non-transitory computer-readable medium having stored thereon computer-executable instructions which, when executed by one or more processors, cause a computer to perform functions comprising:
    (a) initializing operation of a physical service processor to communicatively couple to a remote file system over a communications link, wherein the physical service processor has a first set of network configuration settings and at least one physical network interface, such that the physical service processor is operative to perform at least one remote management function for at least one target computer via the at least one physical network interface, a virtual service processor is executable to be operative to emulate operation of the physical service processor, the virtual service processor has a second set of network configuration settings corresponding to the first set of network configuration settings of the physical service processor and at least one virtual network interface configured to emulate operation of the at least one physical network interface of the physical service processor, wherein the second set of network configuration settings of the virtual service processor comprises at least one network configuration setting for the at least one virtual network interface, and the remote file system has a computer-executable development module for modifying the first set of network configuration settings of the physical service processor and the second set of network configuration settings of the virtual service processor;
    (b) causing the development module to modify the second set of network configuration settings of the virtual service processor, comprising changing the at least one network configuration setting for the at least one virtual network interface of the virtual service processor by:
        (i) selecting at least one service to be provided by a remote server computer; and
        (ii) selecting a port number for at least one service provided by a remote server computer; and
    (c) in response to the second set of network configuration settings being modified,
        (1) initializing operation of the virtual service processor with the modified second set of network configuration settings; and
        (2) verifying that the virtual service processor, when initialized with the modified second set of network configuration settings, operates without error.

9. The non-transitory computer-readable medium of claim 8, wherein the functions further comprise, if the virtual service processor operates without error when initialized with the modified second set of network configuration settings, writing a firmware to a memory device of the physical service processor, the firmware having a new set of network configuration settings corresponding to the modified second set of network configuration settings of the virtual service processor.

10. The non-transitory computer-readable medium of claim 9, wherein the firmware is configured such that, when executed, the physical service processor is initialized with the new set of network configuration settings.

11. The non-transitory computer-readable medium of claim 8, wherein the remote file system is communicatively coupled to a hardware layer that is operatively associated with the physical service processor.

12. The non-transitory computer-readable medium of claim 11, wherein the development module is communicatively coupled to a virtual network layer on the hardware layer, and the virtual network layer is operatively associated with the virtual service processor.

13. A system, comprising:
- a physical service processor having a first set of network configuration settings and at least one physical network interface, such that the physical service processor is operative to perform at least one remote management function for at least one target computer via the at least one physical network interface, wherein a virtual service processor is executable to be operative to emulate operation of the physical service processor, and the virtual service processor has a second set of network configuration settings corresponding to the first set of network configuration settings of the physical service processor, and at least one virtual network interface configured to emulate operation of the at least one physical network interface of the physical service processor, and wherein the second set of network configuration settings of the virtual service processor comprises at least one network configuration setting for the at least one virtual network interface; and
- a remote file system configured to be communicatively coupled to the physical service processor over a communications link, wherein the remote file system has a computer-executable development module for modifying the first set of network configuration settings of the physical service processor and the second set of network configuration settings of the virtual service processor;
- wherein the system stores computer-executable instructions, and the computer-executable instructions, when executed at one or more processors, are configured to:
  (a) initialize the operation of the physical service processor to communicatively couple to the remote file system over the communication link;
  (b) cause the development module to modify the second set of network configuration settings of the virtual service processor, comprising changing the at least one network configuration setting for the at least one virtual network interface of the virtual service processor by:
    (i) selecting at least one service to be provided by a remote server computer; and
    (ii) selecting a port number for at least one service provided by a remote server computer; and
  (c) in response to the second set of network configuration settings being modified,
    (1) initialize operation of the virtual service processor with the modified second set of network configuration settings; and
    (2) verify that the virtual service processor, when initialized with the modified second set of network configuration settings, operates without error.

14. The system of claim 13, wherein the computer-executable instructions, when executed at the one or more processors, are further configured to:
if the virtual service processor operates without error when initialized with the modified second set of network configuration settings, write a firmware to a memory device of the physical service processor, the firmware having a new set of network configuration settings corresponding to the modified second set of network configuration settings of the virtual service processor,
wherein the firmware is configured such that, when executed, the physical service processor is initialized with the new set of network configuration settings.

15. The system of claim 13, wherein the remote file system is communicatively coupled to a hardware layer that is operatively associated with the physical service processor.

16. The system of claim 15, wherein the development module is communicatively coupled to a virtual network layer on the hardware layer, and the virtual network layer is operatively associated with the virtual service processor.

* * * * *